(12) United States Patent
Booms et al.

(10) Patent No.: US 9,423,877 B2
(45) Date of Patent: Aug. 23, 2016

(54) NAVIGATION APPROACHES FOR MULTI-DIMENSIONAL INPUT

(75) Inventors: Douglas Matthew Booms, Seattle, WA (US); Parag K. Garg, Woodinville, WA (US); Jonathan D. Morrison, North Bend, WA (US)

(73) Assignee: Amazon Technologies, Inc., Reno, NV (US)

( * ) Notice: Subject to any disclaimer, the term of this patent is extended or adjusted under 35 U.S.C. 154(b) by 156 days.

(21) Appl. No.: 13/404,213

(22) Filed: Feb. 24, 2012

(65) Prior Publication Data
US 2013/0222246 A1 Aug. 29, 2013

(51) Int. Cl.
| G06F 3/00 | (2006.01) |
| G06F 3/01 | (2006.01) |
| G06F 3/03 | (2006.01) |
| G06F 3/0346 | (2013.01) |
| G06F 3/0484 | (2013.01) |

(52) U.S. Cl.
CPC .............. *G06F 3/017* (2013.01); *G06F 3/011* (2013.01); *G06F 3/0304* (2013.01); *G06F 3/0346* (2013.01); *G06F 3/0484* (2013.01)

(58) Field of Classification Search
CPC ................................. G06F 3/041; G06F 3/005
USPC .......................... 345/156, 173–179; 715/863
See application file for complete search history.

(56) References Cited

U.S. PATENT DOCUMENTS

| 5,594,469 A | 1/1997 | Freeman et al. |
| 5,790,114 A | 8/1998 | Geaghan et al. |
| 8,413,077 B2 | 4/2013 | Yamamoto et al. |
| 2006/0214926 A1* | 9/2006 | Kolmykov-Zotov et al. ............................. 345/179 |
| 2008/0101786 A1 | 5/2008 | Pozniansky et al. |
| 2009/0195497 A1* | 8/2009 | Fitzgerald et al. ........... 345/156 |
| 2009/0278915 A1 | 11/2009 | Kramer et al. |
| 2010/0123667 A1* | 5/2010 | Kim ........................ G06F 3/044 345/173 |
| 2010/0125816 A1 | 5/2010 | Bezos |
| 2010/0188428 A1* | 7/2010 | Shin et al. .................... 345/661 |
| 2010/0234094 A1 | 9/2010 | Gagner et al. |

(Continued)

FOREIGN PATENT DOCUMENTS

| EP | 2817694 | 12/2014 |
| JP | 2000-056916 | 2/2000 |

(Continued)

OTHER PUBLICATIONS

International Search Report and Written Opinion issued in corresponding International Application No. PCT/US13/26828 dated Apr. 26, 2013 (7 pages).

(Continued)

*Primary Examiner* — Alexander Eisen
*Assistant Examiner* — Cory Almeida
(74) *Attorney, Agent, or Firm* — Polsinelli LLP (57) ABSTRACT

Multi-dimensional gesture input to a computing device can be improved by providing a mechanism to lock or reduce the effects of motion in unintended directions. In one example, a user can navigate in two dimensions, then provide a selection action through motion in a third dimension. If a computing device analyzing the gesture is able to detect the selection action, the device can limit motion outside the corresponding third dimension in order to ensure that the proper selection action is performed. Various thresholds, values, or motions can be used to limit motion in one or more axes for any appropriate purpose as discussed herein.

25 Claims, 7 Drawing Sheets

(56) References Cited

U.S. PATENT DOCUMENTS

| | | |
|---|---|---|
| 2010/0235786 A1 | 9/2010 | Maizels et al. |
| 2010/0281440 A1 | 11/2010 | Underkoffler et al. |
| 2010/0295781 A1* | 11/2010 | Alameh et al. ............... 345/158 |
| 2011/0050569 A1 | 3/2011 | Marvit et al. |
| 2011/0099476 A1 | 4/2011 | Snook et al. |
| 2011/0185309 A1* | 7/2011 | Challinor et al. ............ 715/784 |
| 2011/0289455 A1 | 11/2011 | Reville et al. |
| 2011/0289456 A1* | 11/2011 | Reville et al. ................ 715/830 |
| 2011/0304541 A1 | 12/2011 | Dalal |

FOREIGN PATENT DOCUMENTS

| | | |
|---|---|---|
| JP | 2004-246814 | 9/2004 |
| JP | 2010-170527 | 8/2010 |
| WO | WO 2013/126386 | 8/2013 |

OTHER PUBLICATIONS

Extended Search Report for European Patent Application EP13751133.3, mailed Sep. 18, 2015, 14 pages.

* cited by examiner

NAVIGATION APPROACHES FOR MULTI-DIMENSIONAL INPUT

BACKGROUND

People are increasingly utilizing portable electronic devices to perform a wide variety of tasks. As the variety of tasks increases, so increases the desire to interact with these devices in new and helpful ways. One such interaction approach involves making gestures or specific motions within a detectable range of a device. For example, a user can move a hand or arm in a certain direction to provide input to the device. Unfortunately, certain motions such as distinct horizontal and vertical motions are not natural for a human user. There often will be some drift or angle of the input, particularly as a result of the human fingers, hand, and arm each being attached at a single respective pivot point, which typically leads to some amount of rotation with a user motion. Depending on factors such as the resolution or sensitivity of a device, this amount of non-linearity or other such deviation can lead to inaccurate or indeterminable input being provided to the device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, various embodiments enable a user to provide various types of input to an electronic device using motions or gestures performed at a distance from the device. In at least some embodiments, a user is able to perform gestures or other such motions within a field of view of one or more cameras of a computing device. The cameras can capture image information that can be analyzed to locate and track at least one user feature or object used to perform the gesture. The computing device can utilize a recognized gesture to determine input to be provided, such as a character to be selected, a navigation to be made, and the like.

Approaches in accordance with various embodiments can improve the accuracy of motion- or gesture-based input by accounting for drift or unintended changes due to natural human motion and other such factors. Gestures can often be performed in two or three dimensions, but a user will often not perform a gesture in a precise way due to mechanics of the human body. Various embodiments can attempt to determine different types of actions or gestures, such as selection actions, that are performed using motion along one axis or direction with respect to the device. Even though the user might utilize motion in other directions while performing these actions, the device can lock or limit the amount of motion in one or more other directions, to attempt to improve the accuracy of the intended input. Such approaches can be used for any dimension, axis, plane, direction, or combination thereof, for any appropriate purpose as discussed and suggested elsewhere herein. Such approaches also can be utilized where the device is moved relative to a user feature or other such object.

Various other applications, processes, and uses are presented below with respect to the various embodiments.

Figure 1:
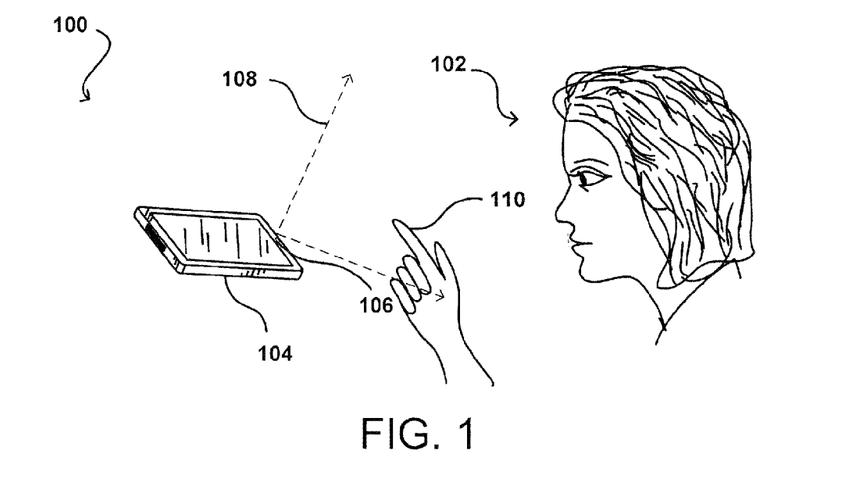
FIG. 1 illustrates an example of a user providing motion-based input to an electronic device in accordance with various embodiments.

As discussed, various approaches enable a user to provide input to a device through motion or gesture input. For example, FIG. 1 illustrates an example situation 100 wherein a user 102 is able to provide input to a computing device 104 by moving a feature, such as the user's fingertip 110, within a field of view 108 of at least one camera 106 or sensor of the computing device 104. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, and the like. In this example, the computing device includes a single camera operable to capture images and/or video of the user's fingertip 110 and analyze the relative position and/or motion of that feature over time to attempt to determine input that the user intends to provide to the device. It should be understood, however, that there can be additional cameras or alternative sensors or elements in similar or different places with respect to the device in accordance with various embodiments. The image can be analyzed using any appropriate algorithms to recognize and/or locate a feature of interest, as well as to track that feature over time. Examples of feature tracking from captured image information can be found, for example, in co-pending U.S. patent application Ser. No. 12/332,049, filed Dec. 10, 2008, and entitled "Movement Recognition as Input Mechanism," which is hereby incorporated herein by reference.

Figure 2A:
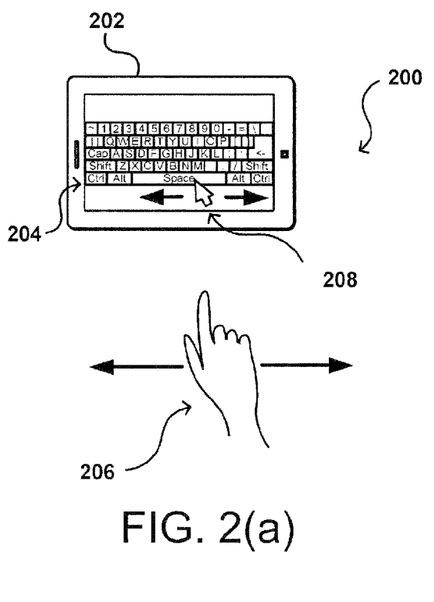
FIGS. 2(a) and 2(b) illustrate an example process whereby a user is able to provide motions in two or three dimensions in order to specify an element to select, and utilize motion along a single dimension to select that element in accordance with various embodiments.

By being able to track the motion of a feature or object with respect to the device, the device can enable a user to interact with an interface displayed on the device, for example, and select one or more objects displayed or otherwise presented as part of that interface. For example, in the situation 200 of FIG. 2(a) the user is able to move the user's hand 206 in a virtual plane with respect to the device, such as in horizontal and vertical directions with respect to the display screen of the device, in order to move a virtual cursor 208 across a virtual keypad 204 displayed on the computing device. The cursor 208 can move with the user's hand, finger, or other such feature as that feature moves with respect to the device, in order to enable the user to control the cursor without physically contacting the device. While a cursor and keyboard are used in this example, it should be understood that any appropriate interface elements can utilize approaches discussed herein within the scope of the various embodiments.

Figure 2B:
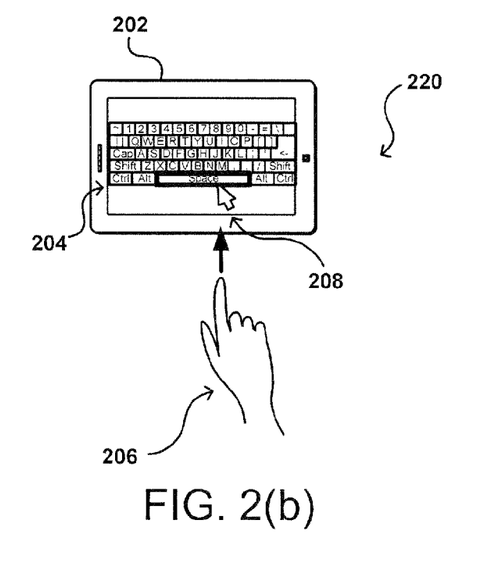

When the user wants to select an interface object, such as a letter or character on the virtual keypad 204, the user can perform a selection action with the tracked feature. In the example situation 220 of FIG. 2(*b*), this selection action includes moving the feature towards the device, whether by moving the user's entire hand 206 or making a "push" motion with the user's fingertip. The device is able to distinguish this motion (herein referred to as a z-motion) along an axis orthogonal to the display screen of the device from the motion in a plane parallel to the display screen to move the cursor (herein referred to as x/y motion). The z-motion then can be used to indicate to the device that the currently indicated interface object is to be selected. It should be understood that in at least some embodiments the x/y motion does not need to be in a plane parallel to the display screen, and that at least some tilt or angle can be allowed within the scope of the various embodiments.

Figure 3A:
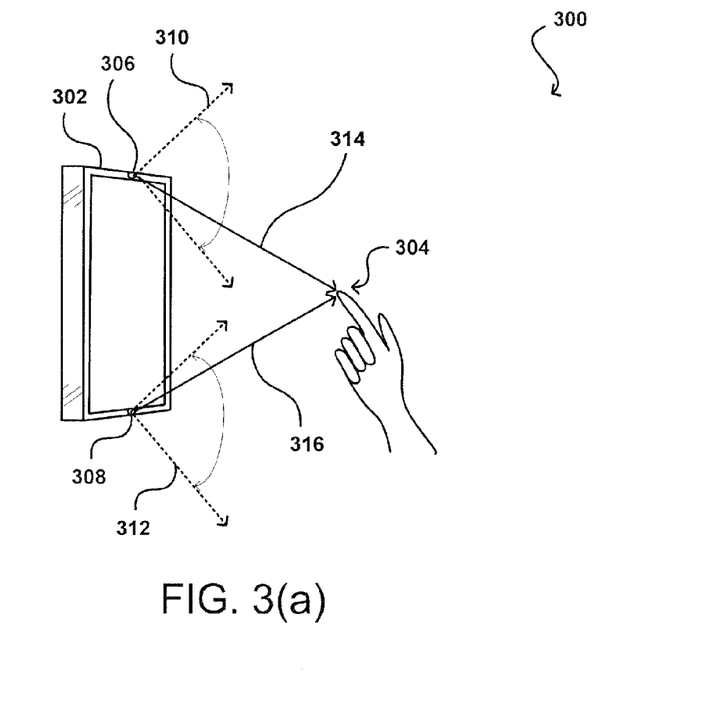
FIGS. 3(a), 3(b), and 3(c) illustrate a camera-based approach for determining a location of a feature that can be used in accordance with various embodiments.
Figure 3B:
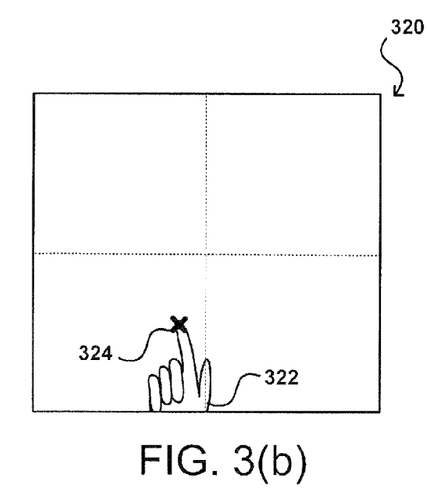
Figure 3C:
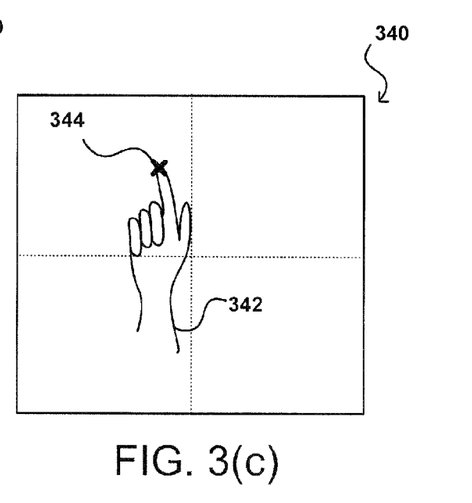

As mentioned, approaches in accordance with various embodiments can capture and analyze image information or other sensor data to determine information such as the relative distance and/or location of a feature of the user that is capable of providing (or assisting in providing) such input. For example, FIGS. 3(*a*), 3(*b*), and 3(*c*) illustrate one example approach to determining a relative direction and/or location of at least one feature of a user that can be utilized in accordance with various embodiments. In this example, input can be provided to a computing device 302 by monitoring the position of the user's fingertip 304 with respect to the device. In some embodiments, a single camera can be used to capture image information including the user's fingertip, where the relative location can be determined in two dimensions from the position of the fingertip in the image and the distance determined by the relative size of the fingertip in the image. In other embodiments, a distance detector or other such sensor can be used to provide the distance information. The illustrated computing device 302 in this example instead includes at least two different image capture elements 306, 308 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. The cameras can include full color cameras, infrared cameras, grayscale cameras, and the like. Further, it should be understood that terms such as "top" and "upper" are used for clarity of explanation and are not intended to require specific orientations unless otherwise stated.

In this example, the upper camera 306 is able to see the fingertip 304 of the user as long as that feature is within a field of view 310 of the upper camera 306 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 314 of the fingertip with respect to the upper camera. If input is determined based only on relative direction to one camera, the approximate direction 314 can be sufficient to provide the appropriate input, with no need for a second camera or sensor, etc. In some embodiments, methods such as ultrasonic detection, feature size analysis, luminance analysis through active illumination, or other such distance measurement approaches can be used to assist with position determination as well.

In this example, a second camera is used to assist with location determination as well as to enable distance determinations through stereoscopic imaging. The lower camera 308 in FIG. 3(*a*) is also able to image the fingertip 304 as long as the feature is at least partially within the field of view 312 of the lower camera 308. Using a similar process to that described above, appropriate software can analyze the image information captured by the lower camera to determine an approximate direction 316 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a 45 degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

Further illustrating such an example approach, FIGS. 3(*b*) and 3(*c*) illustrate example images 320, 340 that could be captured of the fingertip using the cameras 306, 308 of FIG. 3(*a*). In this example, FIG. 3(*b*) illustrates an example image 320 that could be captured using the upper camera 306 in FIG. 3(*a*). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 322, at least one point of interest 324, here the tip of the user's index finger, is determined. As discussed above, the software can use the location of this point with information about the camera to determine a relative direction to the fingertip. A similar approach can be used with the image 340 captured by the lower camera 308 as illustrated in FIG. 3(*c*), where the hand 342 is located and a direction to the corresponding point 344 determined. As illustrated in FIGS. 3(*b*) and 3(*c*), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

Figure 4A:
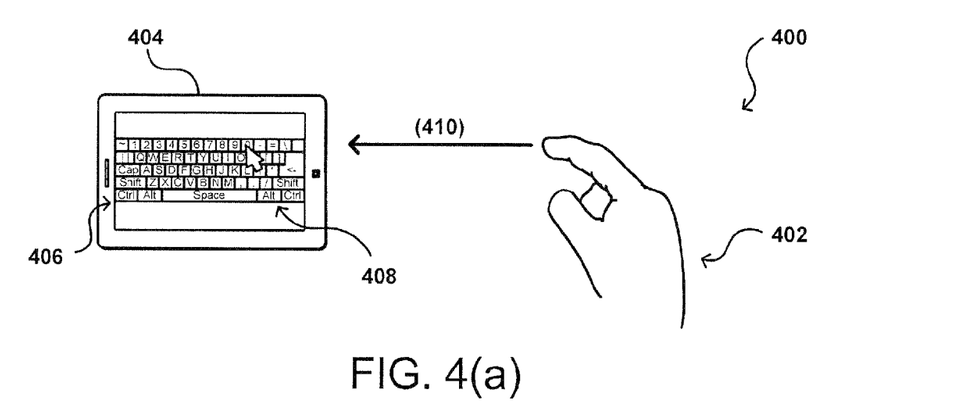
FIGS. 4(a), 4(b), and 4(c) illustrate example natural motions that a user might make while attempting to select an interface object in accordance with various embodiments.

As discussed, the image information can be used to track a feature of a user with respect to a computing device, to enable a user to provide input to the computing device. The user will typically move in one, two, or three dimensions with respect to the device, and in at least some embodiments can perform a selection motion, action, or gesture to select a particular graphical element. In at least some cases, this selection action can include pressing a finger forward to virtually "push" or "press on" the item. Similar gestures can be used for other purposes as well, such as where a user presses a finger forward to zoom into an area of the screen or otherwise perform an action along the z-direction. FIG. 4(a) illustrates an example situation 400 showing such an action. In this example the user has previously moved a finger in the x/y direction (as discussed with respect to FIG. 2(a)) to cause a cursor 408 to be moved to a desired character of a virtual keyboard 406 displayed on a computing device. When the cursor is illustrated to be positioned over the desired character, for example, the user can perform a selection motion such as to move a fingertip on the user's hand 402 towards the device. From the device point of view, the user should provide the motion substantially toward the device, in the z-direction, along the illustrated target vector 410.

Figure 4B:
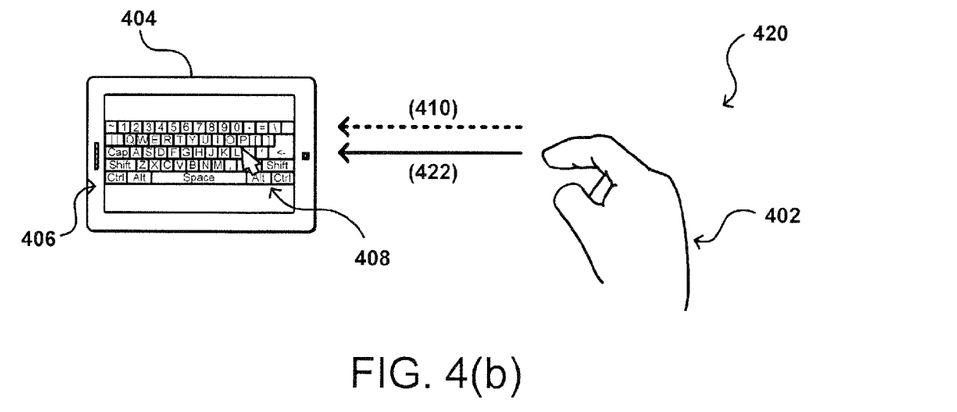
Figure 4C:
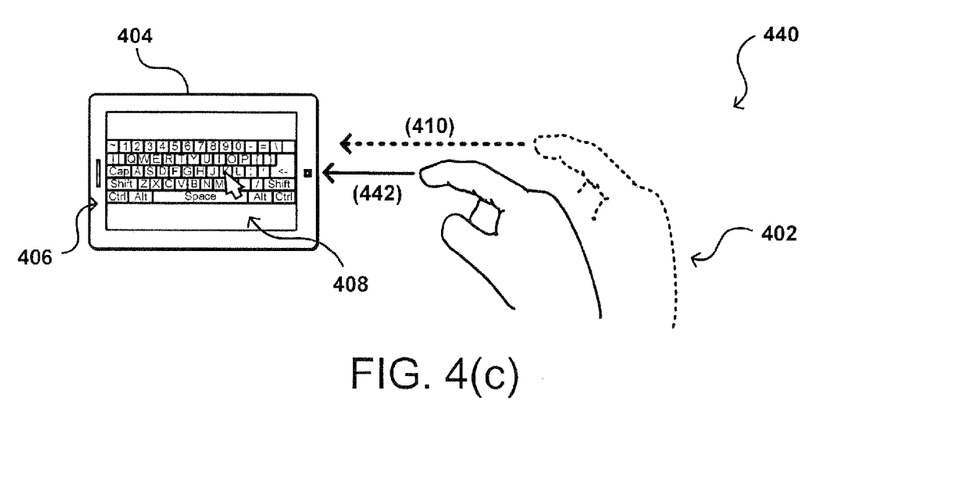

Unfortunately, the structure of the human body and the types of natural human motion do not readily lend themselves to such motion. For example, FIG. 4(b) illustrates an example situation 420 wherein the position of the fingertip of the user's hand 402 has been moved "forward" from the perspective of the user. As can be seen, however, the fact that the finger is attached at the knuckle as a pivot point has caused the fingertip to move downward in addition to forward. From the perspective of the computing device, the fingertip at that point can be viewed as selecting along a different vector 422, as the lateral position in the x/y direction has changed. During this x/y movement, the cursor can be determined to have moved laterally as well, which can result in the user accidentally selecting an incorrect character and/or the device incorrectly interpreting the motion to select the incorrect letter. FIG. 4(c) illustrates a similar example situation 440 where the user has moved the fingertip forward by moving the user's hand 402. As can be seen, the pivot points of the wrist and/or elbow cause the fingertip to make a similar x/y motion such that the computing device might interpret the selection action to correspond to a different vector 442 from the intended vector 410, or anywhere in-between.

It should be understood, however, that similar issues can arise in the x/y direction as well. For example, a user wanting to make a left-right scroll motion with the user's hand typically will have at least some level of arc in the trajectory due to the human pivot points and natural motion. Similarly, a user wanting to scroll up a page with a finger by making an up motion typically will also have some z-component. Thus, it can be difficult for a user to provide input that can accurately be interpreted by a computing device when that input is intended to have motion primarily along one or two axes, but the natural motion can have components in two or three axes.

Further, the ability of a user to perform precise gestures can be more difficult to control when the user is looking in a direction other than towards a feature making a gesture or the device analyzing the gesture. For example, a user might be providing gesture input to a device while talking to another person in the room, where the user is looking at that other person rather than the device or gesture. Similarly, the user might be looking at a second device, such as a television or monitor, while providing gesture input to a first device, such as a tablet computer or smart phone in the user's lap. In some cases, the first device might be used to determine the gesture input and provide input data to the second device. Other such situations can arise as well. When the user is looking elsewhere, the user can tend to make gestures that are at more of an angle, or at least less precise, with respect to the detecting device than if the user was looking at the device or gesture, which can further impact the ability of the device to determine the correct input or the user to perform the intended gesture correctly.

Systems and methods in accordance with various embodiments can provide for improved gesture- or motion-based input by enabling a device to "lock" or otherwise limit certain axes of motion during various gestures or other motions by a user. For example, a device can determine when a user is making a selection gesture, and can limit the detected motion to the axis (or axes) of the selection gesture. Various thresholds, sensitivities, or limits can be set or adjusted as appropriate to improve the accuracy of gesture interpretation and/or input determination.

Figure 5A:
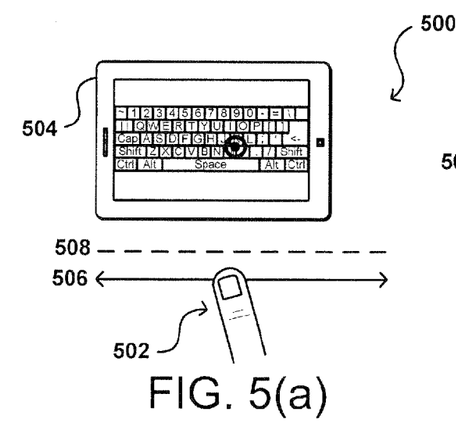
FIGS. 5(a), 5(b), 5(c), 5(d), 5(e), and 5(f) illustrate example motion thresholds or criteria that can be used to determine the number of directions of input to accept and/or process in accordance with various embodiments.

For example, FIG. 5(a) illustrates an example motion interpretation approach 500 that can be used in accordance with various embodiments. In this example, the user uses a feature such as the user's finger 502 to select characters from a virtual keypad displayed on a computing device 504. In order to move a virtual cursor or other indicator "across" the screen, the user can move the user's finger in a plane substantially parallel to the plane of the display screen, for example, such as is illustrated by a movement vector 506. The distance of this plane or vector can be determined based at least in part upon the original distance to the user's finger as detected or estimated by the device. When a user wants to select a character, the user will move that finger (or another finger) towards the device in order to virtually "tap" on that character key. In order to be recognized as a selection action or gesture, the user must move the finger forward by a minimum amount in this example. Accordingly, that amount of movement can be set as a threshold 508 distance from the device within which the user must move the finger to perform a selection action. If the user does not move the finger within that threshold distance, any variation in z can be interpreted as natural variations in distance resulting from a user moving the finger in the x/y plane (or another such action).

Figure 5B:
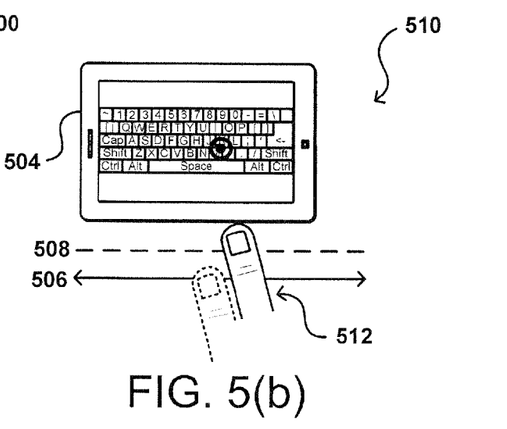

When a user moves the fingertip (or other tracked feature) within that selection threshold distance, the movement can be registered as a selection action. In addition, in order to improve the accuracy of the input, the device in this embodiment can be configured to only consider z-direction movement when the feature passes within the selection threshold distance. Such an approach prevents the user's finger from inadvertently moving in x/y during a selection motion to select an incorrect character. The position in x/y can be locked as of when the feature passed the threshold 508, or at the beginning of the z-motion, as may rely upon buffered location data or other such information. For example, FIG. 5(b) illustrates an example situation 510 wherein the user's finger 512 has passed within the selection threshold. It can be seen that, in addition to movement in the z-direction, there has also been some movement in the x/y direction. In at least one embodiment, the device can keep track of where the finger was when the selection motion started, and can utilize those x/y coordinates for the selection action. In some embodiments, the sensitivity of the x/y motion can instead be adjusted such that motion in those directions is still possible, but greater amounts of motion are needed to change the input x/y position while inside the selection threshold.

Figure 5C:
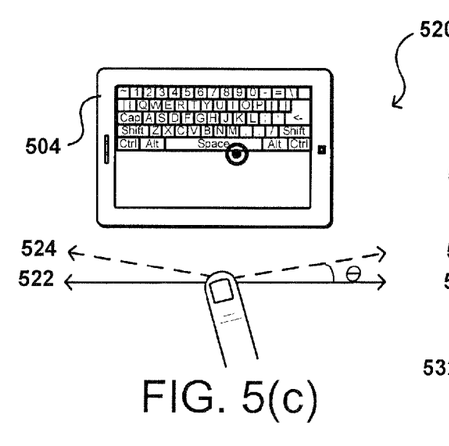
Figure 5D:
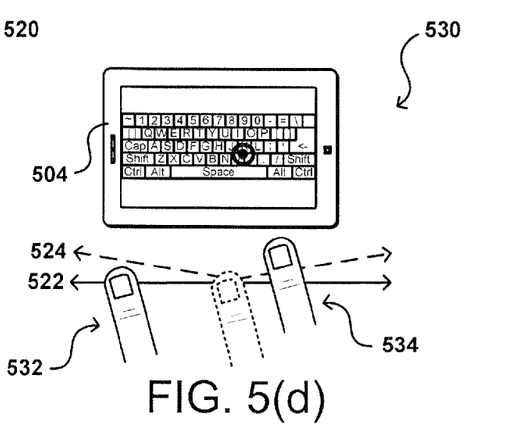

FIG. 5(c) illustrates another example situation 520 wherein the motion in the x/y direction can be limited with an amount of motion in the z-direction. In this example, the device allows for an amount of variation in the z-direction that is proportional to an amount of movement in the x/y direction. For example, the user might want to move a cursor while following a movement vector 522, but up to an angle θ of z-direction movement (e.g., 10-20 degrees) is allowed for an amount of x/y movement, resulting in a relative distance threshold 524. Thus, if a user has very little movement in x/y then any small movement in z might be enough to register as a selection action, at which point changes in input in x/y can be locked or limited as discussed elsewhere herein. As the amount of movement in x/y increases, the amount of movement in z to register as a selection action increases accordingly. Thus, as illustrated in FIG. 5(d), movement of the finger to the first finger position 532 would not register as selection input, but movement of the finger to the second finger position 534 would register as selection input, with a selection position in x/y of where the finger stared the motion, crossed the distance threshold, or another such position.

Figure 5E:
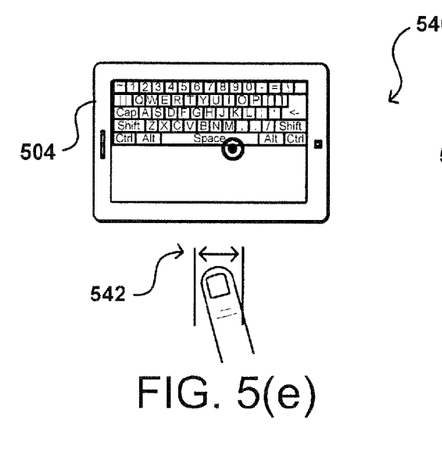
Figure 5F:
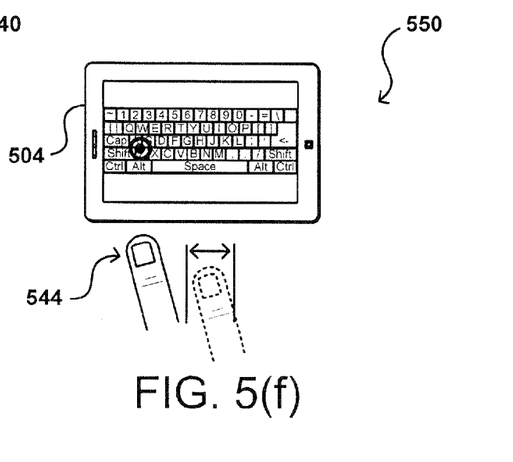

FIG. 5(e) illustrates another example approach 540 wherein motion input can be locked to the z-direction unless there is at least a threshold amount of movement 542 in the x/y direction. Thus, the finger moving forward would be treated as moving only along the z-direction as long as the x/y position stays within the threshold 542. Any movement outside that threshold can be treated as input in two or three dimensions. For example, in FIG. 5(f) the finger position 544 has moved outside the threshold, such that the motion is not interpreted as a selection action.

It should be understood that various other types of thresholds or limits can be used as well within the scope of the various embodiments, and that the thresholds can be applied to movement in any direction or along any appropriate axis. Further, the position and/or value of these thresholds can vary as well, such as by user, by device, by application, etc. In some embodiments, the thresholds can be a fixed distance or proportional distance, while in other embodiments the thresholds can vary based upon factors such as user distance, accuracy under current conditions, and the like. Further, in some embodiments a user can set or adjust the thresholds manually, while in other embodiments the thresholds are determined automatically or generated as part of a calibration procedure. Various other approaches can be used as well within the scope of the various embodiments.

The locking or limiting of motion input can be performed as part of the detection hardware, part of the analysis software, or at any other appropriate location. Aspects can also be implemented at various different levels as well, such as at the application, API, or operating system level. For example, a gesture sensor having detected a selection action might ignore movement in x/y or only report movement in z. An algorithm determining a selection action might only analyze the z-data until the selection action is over or another such action occurs. In some embodiments, an application might accept and buffer data in all three dimensions, but lock or limit the input along one or more axes upon certain motions or actions. If data is buffered, an additional advantage is that the data can be analyzed if the device later determines that the motion was not part of a selection action, or input should otherwise not have been locked or limited. Various other approaches can be used as well within the scope of the various embodiments.

Figure 6:
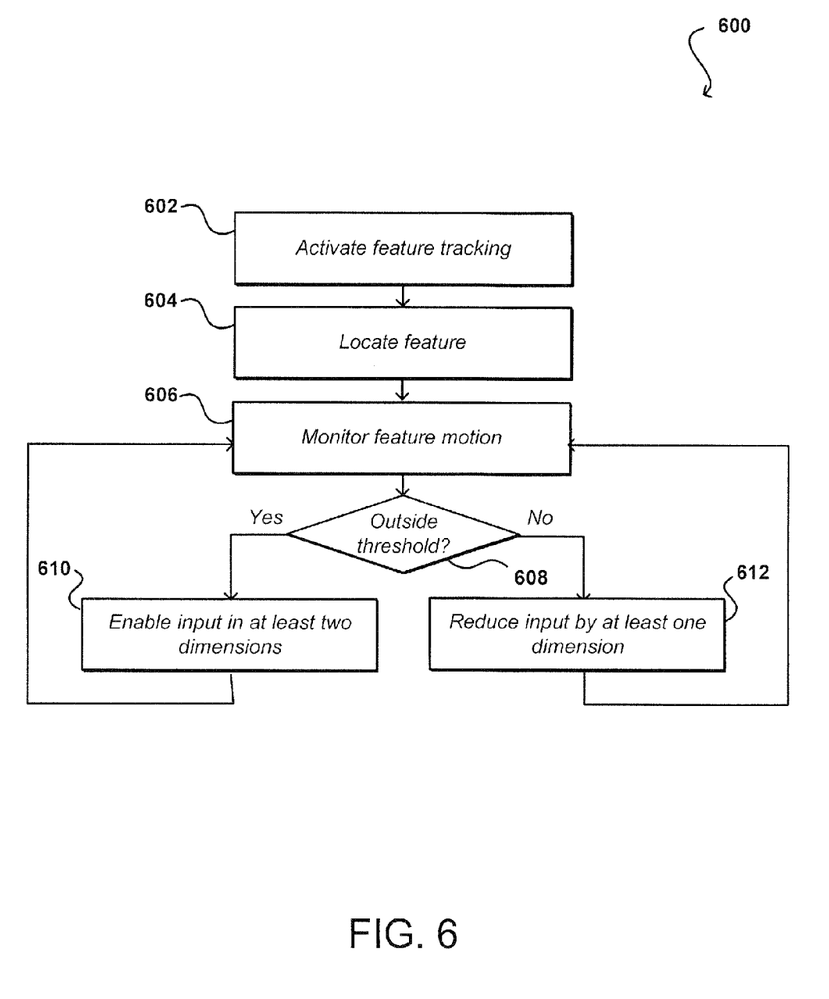
FIG. 6 illustrates an example process for accepting input along an appropriate number of directions that can be utilized in accordance with various embodiments.

FIG. 6 illustrates an example process 600 for providing input to a computing device using gesture and/or motion input that can be used in accordance with various embodiments. It should be understood that, for any process discussed herein, there can be additional, fewer, or alternative steps performed in similar or alternative orders, or in parallel, within the scope of the various embodiments unless otherwise stated. In this example, feature tracking is activated 602 on a computing device. The tracking can be activated manually, by a user, or automatically in response to an application, activation, startup, or other such action. Further, the feature that the process tracks can be specified or adjusted by a user, provider, or other such entity, and can include any appropriate feature such as a fingertip, hand, thumb, elbow, or other such feature. In at least some embodiments a determination can be made as to whether there is sufficient lighting for image capture and analysis, such as by using a light sensor or analyzing the intensity of captured image information. In at least some embodiments, a determination that the lighting is not sufficient can cause one or more types of illumination to be activated on the device. In at least some embodiments, this can include activating one or more white light LEDs positioned to illuminate a feature within the field of view of at least one camera attempting to capture image information. As discussed elsewhere herein, other types of illumination can be used as well, such as infrared (IR) radiation useful in separating a feature in the foreground from objects in the background of an image. Examples of using IR radiation to assist in locating a feature of a user can be found, for example, in co-pending U.S. patent application Ser. No. 13/198,008, filed Aug. 4, 2011, and entitled "Overcoming Motion Effects in Gesture Recognition," which is hereby incorporated herein by reference.

During the process, one or more selected cameras or gesture sensors can capture image information as discussed elsewhere herein. The selected cameras can have fields of view that include at least a portion of the region in front of a display element or other specified area of the device, such that the cameras can image a feature when interacting with that element. The captured image information, which can be a series of still images or a stream of video information in various embodiments, can be analyzed to attempt to determine or locate 604 the relative position of at least one feature to be monitored, such as the relative position of the user's index finger tip of a visible hand. As discussed elsewhere herein, various image recognition, contour matching, color matching, or other such approaches can be used to identify a feature of interest from the captured image information. Once a feature is located and its relative distance determined, the motion of that feature can be monitored 606 over time, such as to determine whether the user is performing an action indicative of input to be provided.

As discussed, at least one threshold or other such measure or criterion can be utilized to determine the number of axes for which to accept or determine input. During monitoring of the motion, the device can determine 608 whether the motion meets, falls within, falls outside, or otherwise reaches or exceeds some threshold with respect to the input to be provided. If the motion is determined to be outside the threshold, the device can enable 610 input in at least two dimensions. If, in this example, the motion is determined to fall inside the threshold, the input can be reduced 612 by at least one dimension. As discussed, this can involve locking or limiting motion in one or more directions in order to improve accuracy of the input. For certain motions, input might be effectively constrained to a direction or plane, etc. As the motions change with respect to the threshold(s), the dimensional input can adjust as well.

While many of the examples discussed herein relate to text entry and element selection, it should be understood that various other uses can benefit from approaches discussed herein as well. For example, a user might utilize motion and gesture input for navigation, gaming, drawing, or other such purposes. When the user makes a certain action or motion, the device can effectively lock out one or more directions of input in order to improve the accuracy of the input. In addition, or alternative, to the thresholds discussed above, other actions or gestures can be used to assist in determining when to lock one or more directions of input. For example, a user might make a certain gesture or shape with the user's hand, such as bringing a finger and thumb together or making another specific hand gesture. In other embodiments, speed might be used to attempt to determine when to lock out other axes. For example, a selection action in z might be determined to be relatively fast, while variations in z due to position drift can be relatively slow, such that an action in z must have at least a minimum velocity to register as a selection action. In some embodiments, locking only occurs when the feature is positioned relative to a selectable object on the display, or other position where locking makes sense or provides an advantage. Certain contexts can be used to determine when to lock input as well, such as when a user is typing versus drawing, scrolling versus flipping, etc. In at least some embodiments, an interface might show an icon or other indicator when input is locked such that the user can know how movement will be interpreted by the device.

A pattern or gesture recognition algorithm can have some intelligence built in to assist with determining how to interpret motion as well. For example, the pattern recognition can have an "auto-correct" type feature, wherein a word that might be off by a letter that is adjacent to another letter on a keyboard might automatically be determined to be the intended input, given a minimum amount of certainty or confidence, etc. Various approaches for handling small deviations in pattern matching, as well as performing auto-correcting of text input, are well known in the art and as such will not be discussed in detail herein.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the hand from various other objects in an image, and would have to identify the hand as a hand, regardless of the hand's orientation. Such an approach can require shape or contour matching, for example, which can still be relatively processor intensive. A less processor intensive approach can involve separating the hand from the background before analysis.

In at least some embodiments, a light emitting diode (LED) or other source of illumination can be triggered to produce illumination over a short period of time in which an image capture element is going to be capturing image information. The LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 7:
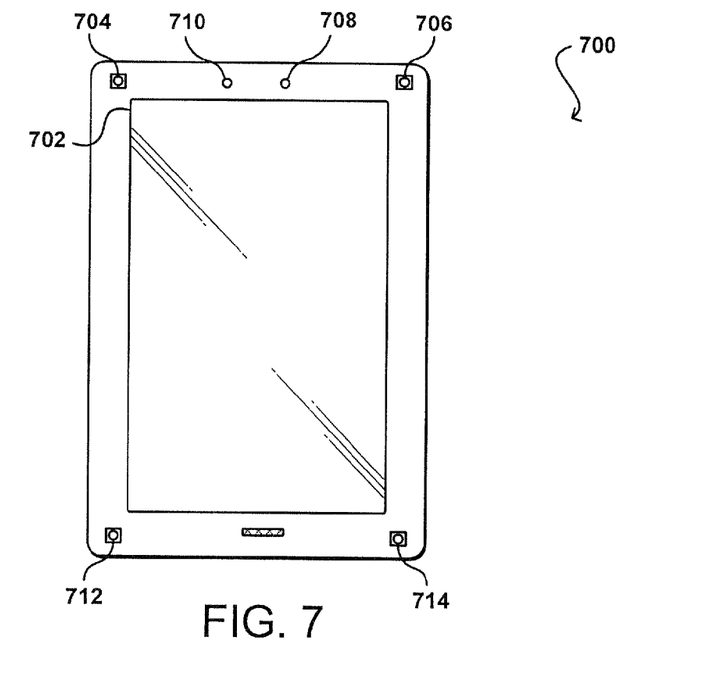
FIG. 7 illustrates an example computing device that can be used in accordance with various embodiments.

FIG. 7 illustrates an example computing device 700 that can be used to perform methods in accordance with various embodiments discussed and suggested herein. In this example, the device has four image capture elements 704, 706, 712, 714 positioned at various locations on the same side of the device as a display element 702, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 708 is included that can be used to determine an amount of light in a general direction of objects to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 8:
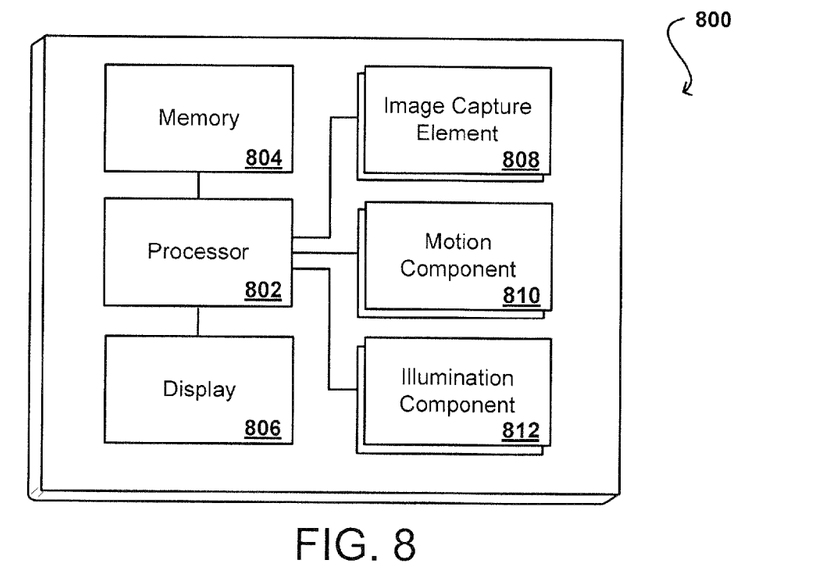
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 810, such as an electronic gyroscope used to determine motion of the device for assistance in input determination. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
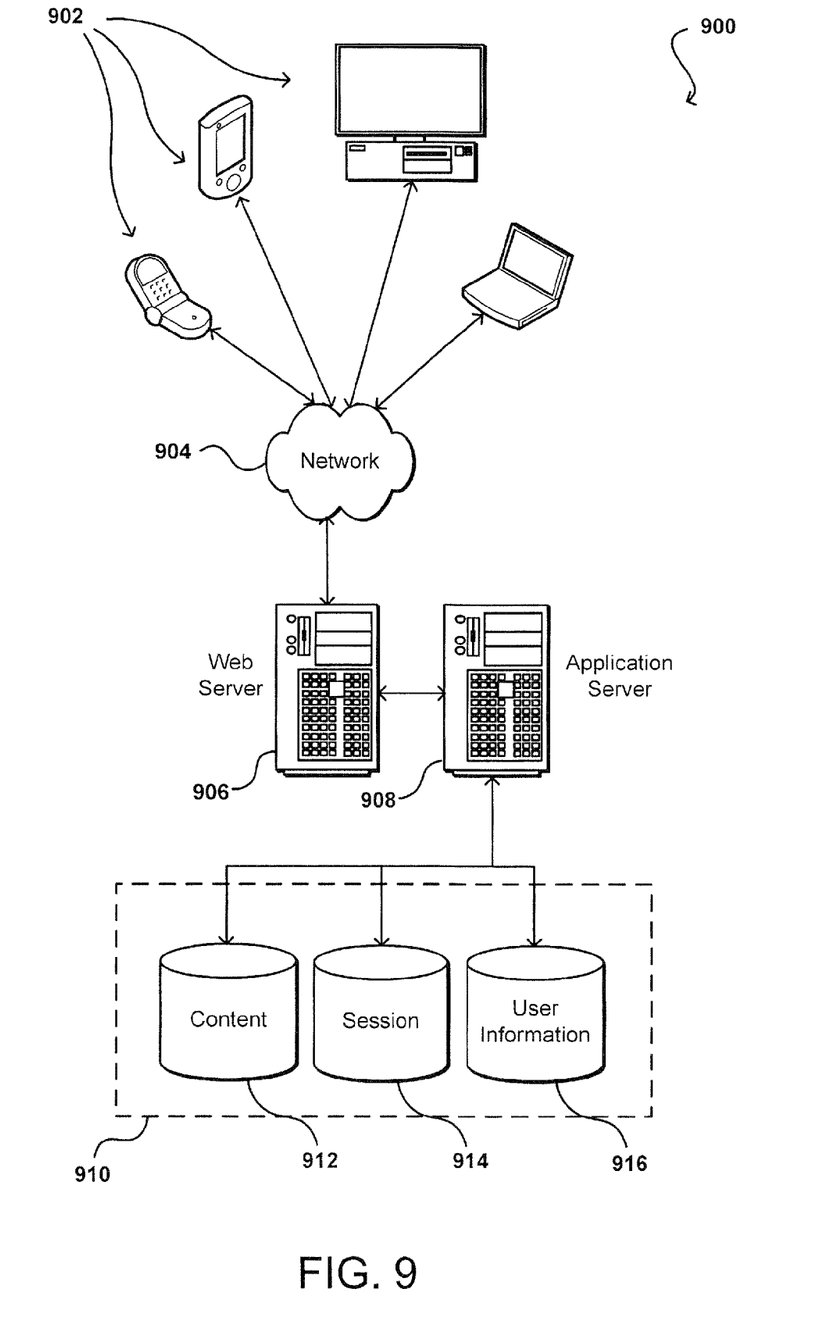
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®. Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of enabling input to a portable computing device, comprising:
    displaying a keyboard on a display screen of a portable computing device;
    capturing image information using a camera of the portable computing device;
    analyzing the image information, using a processor of the portable computing device, to determine a position of a fingertip of a user with respect to the portable computing device;
    updating a current position of a cursor displayed on the display screen of the portable computing device, the cursor configured to move across the keyboard in two dimensions corresponding to contactless movement of the fingertip of the user in a plane relative to the display screen;
    detecting, from the captured image information and using the processor, contactless motion of the fingertip toward the display screen;
    determining a first amount of change in position of the fingertip in the plane relative to the display screen based on the contactless movement of the fingertip in the plane relative to the display screen;
    determining a selection threshold for the contactless motion of the fingertip toward the display screen, the selection threshold at least partly proportional to the first amount of change in position of the fingertip; and
    determining that a second amount of change in position of the fingertip toward the display screen at least meets the selection threshold, and the contactless motion of the fingertip is detected as having at least a minimum velocity:
    locking the current position of the cursor such that the position does not change during the contactless motion of the fingertip toward the display screen; and
    causing a character of the keyboard under the cursor to be selected as input to an application executing on the portable computing device as a result of the contactless motion of the fingertip toward the display screen at the determined position.

2. The computer-implemented method of claim 1, further comprising:
    storing detected motion of the fingertip during the second amount of change in position, wherein a determined position of the fingertip in the plane relative to the display screen at a starting point of the second amount of change in position serves as the current position of the cursor when the character is selected.

3. The computer-implemented method of claim 1, wherein the selection threshold is specific to at least one of the user or the application.

4. The computer-implemented method of claim 1, further comprising:
    determining a starting position of the fingertips; and
    determining an ending position of the fingertip based on the movement of the fingertip in the plane relative to the display screen.

5. The computer-implemented method of claim 4, further comprising:
    determining a distance between a starting position of the fingertip and an ending position of the fingertip; and
    determining the selection threshold for the motion of the fingertip toward the display screen based at least in part on an angle from the starting position of the fingertip and the distance between the starting position of the fingertip and the ending position of the fingertip.

6. A computer-implemented method of enabling input for a portable computing device, comprising:
    capturing image information using a camera of the portable computing device;
    determining, from the captured image information, a position of a fingertip of a user with respect to the portable computing device, the position being determined in at least two dimensions;
    determining an amount of change in the position of the fingertip based on contactless movement of the fingertip in a plane relative to the portable computing device;
    detecting a predetermined action performed by the user, the predetermined action including contactless motion of the fingertip toward the portable computing device;
    determining a selection threshold for the contactless motion of the fingertip toward the portable computing device, the selection threshold at least partly proportional to the amount of change in the position of the fingertip; and
    in response to detecting the predetermined action at least meeting the selection threshold, and motion of the predetermined action having at least a minimum velocity, limiting an amount of change in an input position provided to an application executing on the portable computing device in at least one dimension.

7. The computer-implemented method of claim 6, wherein the position of the fingertip is capable of being determined in three dimensions, and limiting an amount of change in the input position includes limiting the amount of change to one or two dimensions.

8. The computer-implemented method of claim 6, further comprising locking the input position in at least one dimension while the user is performing the predetermined action.

9. The computer-implemented method of claim 6, further comprising decreasing an amount of change in the input position along at least one dimension for corresponding movement of the fingertip in the at least one dimension.

10. The computer-implemented method of claim 6, further comprising at least one of detecting movement of the fingertip past a selection threshold, detecting a predetermined shape of the fingertip, detecting a predetermined gesture, or detecting a predetermined spoken command.

11. The computer-implemented method of claim 6, wherein the predetermined action is customizable for the user.

12. The computer-implemented method of claim 6, further comprising:
    storing position data while limiting the amount of change, the position data capable of being utilized when the predetermined action is determined to have been detected in error.

13. The computer-implemented method of claim 6, further comprising:
    determining a position of multiple features, wherein the amount of change in an input position provided for at least one of the multiple features is limited in at least one dimension upon detecting a predetermined action corresponding to the fingertip.

14. The computer-implemented method of claim 6, wherein changes in the determined position of the fingertip correspond to movement of at least one of the fingertip or the portable computing device.

15. The computer-implemented method of claim 6, further comprising:
emitting infrared light from the portable computing device; and
detecting infrared light reflected back from the fingertip.

16. The computer-implemented method of claim 6, further comprising:
determining an amount of light near the portable computing device using at least one light sensor; and
activating at least one illumination element of the portable computing device when the amount of light is below a minimum light threshold.

17. The computer-implemented method of claim 6, further comprising:
determining an amount of motion of the portable computing device using a motion sensor of the portable computing device during the determining of the position; and
accounting for the motion of the portable computing device when determining changes in the position of the fingertip.

18. A portable computing device, comprising:
a device processor;
a camera; and
a memory device including instructions operable to be executed by the processor to perform a set of actions, enabling the portable computing device to:
capture image information using the camera of the portable computing device;
determine, from the captured image information, a position of a fingertip of a user with respect to the portable computing device, the position being determined in at least two dimensions;
determine an amount of change in the position of the fingertip based on contactless movement of the fingertip in a plane relative to the portable computing device;
detect a predetermined action performed by the user, the predetermined action including contactless motion of the fingertip toward the portable computing device;
determine a selection threshold for the contactless motion of the fingertip toward the portable computing device, the selection threshold at least partly proportional to the amount of change in the position of the fingertip; and
in response to detecting the predetermined action at least meeting the selection threshold, and motion of the predetermined action having at least a minimum velocity, limit an amount of change in position data, corresponding to the determined position of the fingertip with respect to the portable computing device, in at least one dimension with respect to a change in an actual position of the fingertip.

19. The portable computing device of claim 18, wherein the position of the fingertip is capable of being determined in three dimensions, and limiting an amount of change in the position data includes limiting the amount of change to one or two dimensions or locking the position data in at least one dimension while the user is performing the predetermined action.

20. The portable computing device of claim 18, wherein the predetermined action includes at least one of a user moving the fingertip past a selection threshold, shaping the fingertip in a predetermined shape, performing a predetermined gesture, or speaking a predetermined command.

21. The portable computing device of claim 18, wherein the instructions further enable the portable computing device to:
determine a position of multiple features, wherein an amount of change in position data for at least one of the multiple features is limited in at least one dimension upon detecting a predetermined action corresponding to the fingertip.

22. A non-transitory computer-readable storage medium storing instructions that, when executed by at least one processor of a portable computing device, cause the portable computing device to:
capture image information using the camera of the portable computing device;
determine, from the captured image information, a position of a fingertip of a user with respect to the portable computing device, the position being determined in at least two dimensions;
determine an amount of change in the position of the fingertip based on contactless movement of the fingertip in a plane relative to the portable computing device;
detect a predetermined action performed by the user, the predetermined action including contactless motion of the fingertip toward the portable computing device;
determine a selection threshold for the contactless motion of the fingertip toward the portable computing device, the selection threshold at least partly proportional to the amount of change in the position of the fingertip; and
in response to detecting the predetermined action at least meeting the selection threshold, and motion of the predetermined action having at least a minimum velocity, limit an amount of change in position input data for the fingertip in at least one dimension with respect to a change in an actual position of the fingertip.

23. The non-transitory computer-readable storage medium of claim 22, wherein the instructions when executed further cause the portable computing device to:
store position data while limiting the amount of change, the position data capable of being utilized when the predetermined action is determined to have been detected in error.

24. The non-transitory computer-readable storage medium of claim 22, wherein the instructions when executed further cause the portable computing device to:
determine an amount of light near the portable computing device using at least one light sensor; and
activate at least one illumination element of the portable computing device when the amount of light is below a minimum light threshold.

25. The non-transitory computer-readable storage medium of claim 22, wherein the instructions when executed further cause the portable computing device to:
determine an amount of motion of the portable computing device using a motion sensor of the portable computing device during the determining of the position; and
account for the motion of the portable computing device when determining changes in the position of the fingertip.

* * * * *